United States Patent [19]

Yoshimura

[11] Patent Number: 5,071,722
[45] Date of Patent: Dec. 10, 1991

[54] PROCESS FOR PREPARING CADMIUM HYDROXIDE, AND ALKALINE SECONDARY BATTERY AND METHOD FOR CHARGING THE SAME

[75] Inventor: Koji Yoshimura, Kyoto, Japan

[73] Assignee: Japan Storage Battery Co., Ltd., Kyoto, Japan

[21] Appl. No.: 436,988

[22] Filed: Nov. 15, 1989

[30] Foreign Application Priority Data

Feb. 15, 1989 [JP] Japan .................................. 1-35522
Feb. 20, 1989 [JP] Japan .................................. 1-39513

[51] Int. Cl.$^5$ ............................................ H01M 4/26
[52] U.S. Cl. .................................... 429/217; 429/222; 423/104
[58] Field of Search ...................... 429/60, 217, 222; 423/99, 104

[56] References Cited

U.S. PATENT DOCUMENTS

| | | |
|---|---|---|
| 4,172,184 | 10/1979 | Bloom et al. . |
| 4,275,127 | 6/1981 | Ritterman et al. ................ 429/60 X |
| 4,614,696 | 9/1986 | Ito et al. ................................ 429/222 |
| 4,713,126 | 12/1987 | Wolpt et al. ....................... 429/60 X |
| 4,906,539 | 3/1990 | Teresaka .......................... 429/222 X |

FOREIGN PATENT DOCUMENTS 61-240577 10/1986 Japan .
61-240579 10/1986 Japan .
63-250068 10/1988 Japan .
63-252056 10/1988 Japan .

Primary Examiner—Stephen J. Kalafut
Attorney, Agent, or Firm—Sughrue, Mion, Zinn Macpeak & Seas

[57] ABSTRACT

The present invention provides a process for easily preparing $\gamma$-Cd(OH)$_2$. The present invention facilitates improvement in the charge/discharge performance and energy density of an alkaline secondary battery having a cadmium electrode including $\gamma$-Cd(OH)$_2$. The present invention provides superrapid-chargeable batteries, such as a nickel-cadmium alkaline secondary battery having a cadmium electrode including $\gamma$-Cd(OH)$_2$ in which the weight of cadmium hydroxide contained in the negative electrode is 0.95 times as much as the weight of nickel hydroxide contained in the positive electrode, a manganese dioxide-cadmium alkaline secondary battery in which the weight of cadmium hydroxide contained in the negative electrode is not more than 0.84 times as much as the weight of manganese dioxide contained in the positive electrode, and a silver oxide-cadmium alkaline secondary battery in which the weight of cadmium hydroxide contained in the negative electrode is not more than 1.36 times as much as the weight of silver contained in the positive electrode.

12 Claims, 12 Drawing Sheets

FIG. 1
• : β-Cd(OH)$_2$
○ : γ-Cd(OH)$_2$
△ : Cd
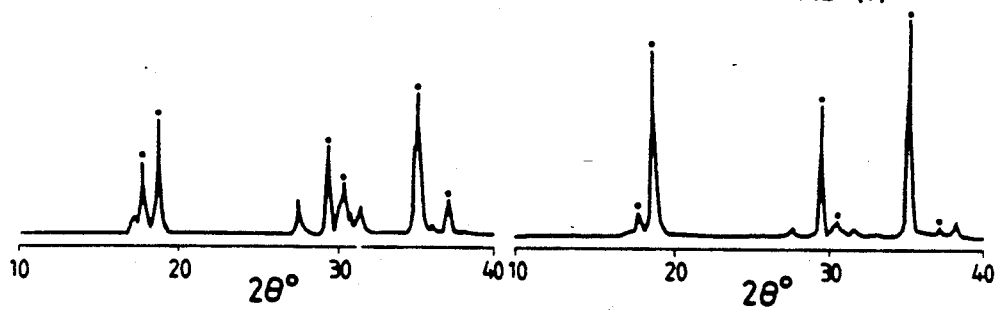
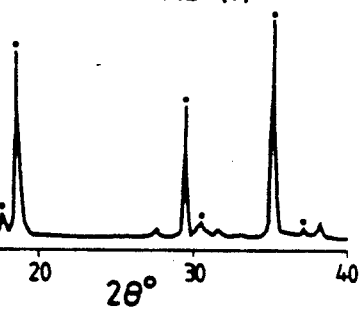
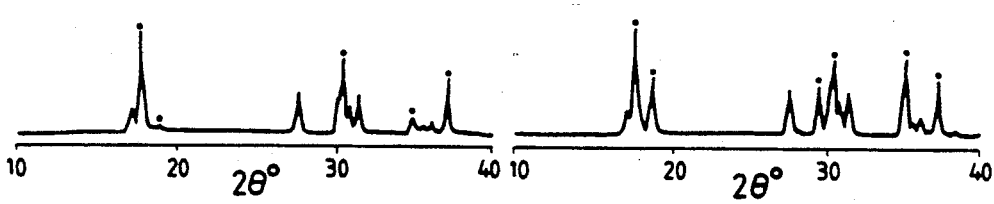
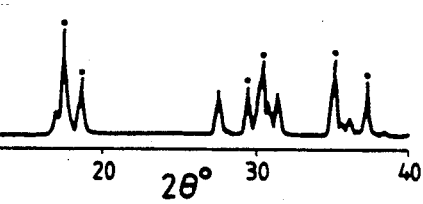
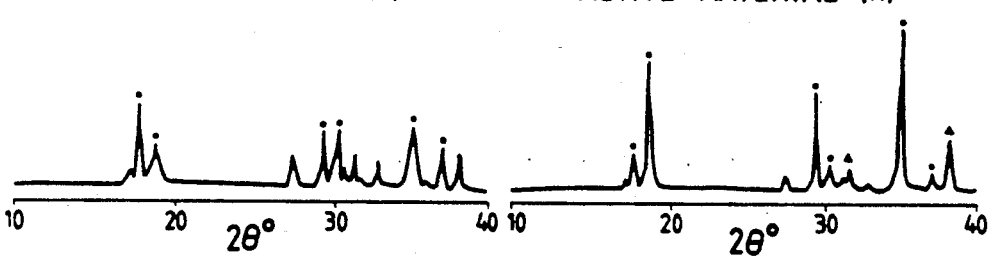
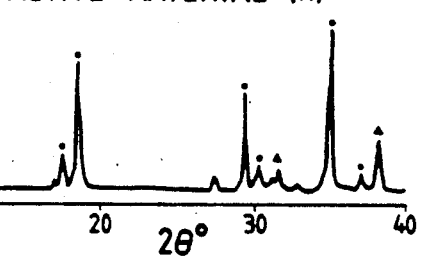
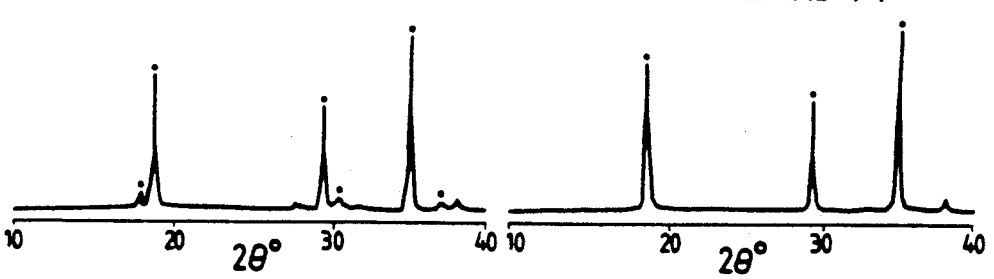
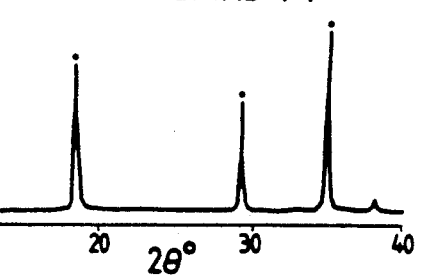
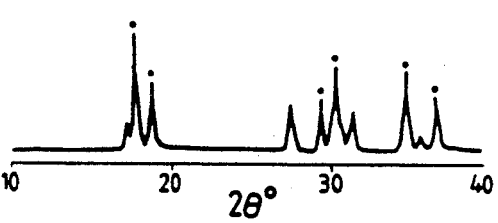

FIG. 3
● : β-Cd(OH)$_2$
○ : γ-Cd(OH)$_2$
(K-1) 6M-KOH +0.5g/ℓ H.E.C.
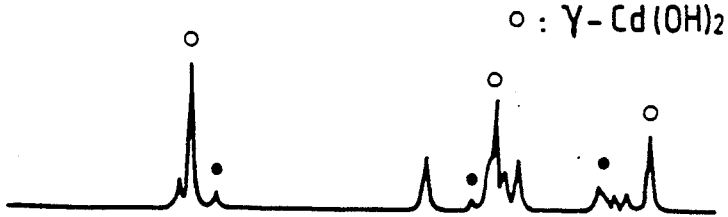
(K-2) 6M-KOH +1g/ℓ H.E.C.
(K-3) 6M-KOH +2g/ℓ H.E.C.
(K-4) 6M-KOH +4g/ℓ H.E.C.
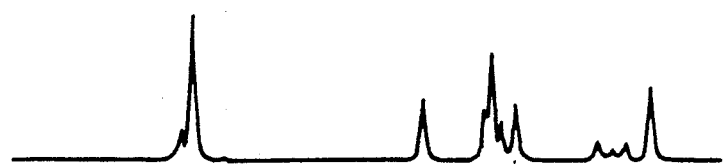
(K-5) 6M-KOH +10g/ℓ H.E.C.
(K-6) 6M-KOH +20g/ℓ H.E.C.
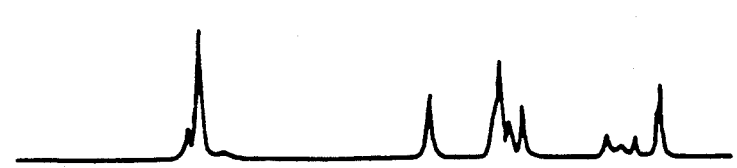
(K-7) 6M-KOH +50g/ℓ H.E.C.
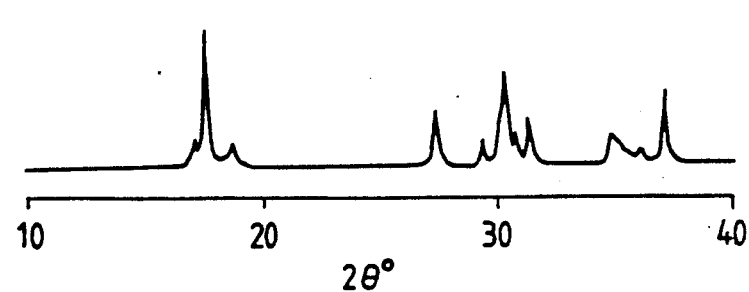
2θ°

FIG. 4
● : β-Cd(OH)₂
○ : γ-Cd(OH)₂
(ℓ-1) H.E.C.: 0.02 wt%
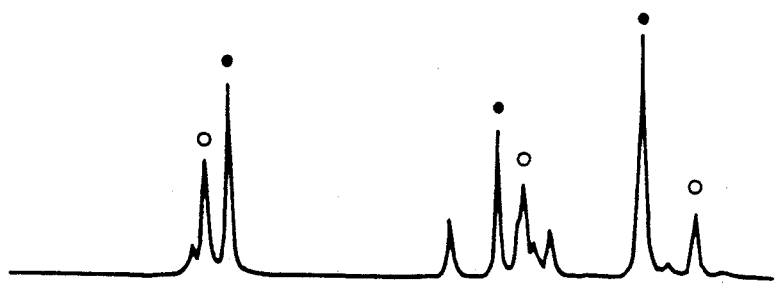
(ℓ-2) H.E.C.: 0.05 wt%
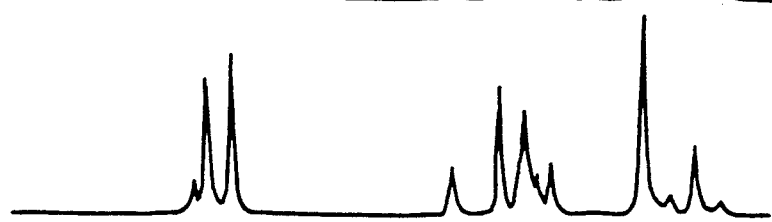
(ℓ-3) H.E.C.: 0.2 wt%
(ℓ-4) H.E.C.: 0.4 wt%
(ℓ-5) H.E.C.: 1 wt%
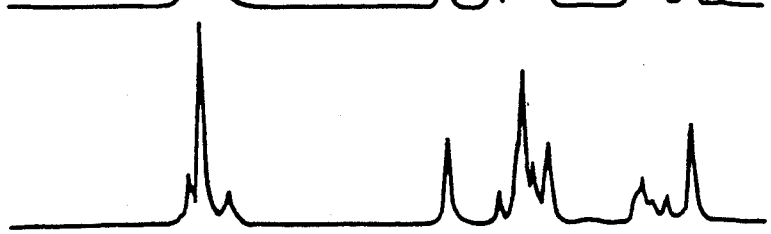
(ℓ-6) H.E.C.: 2 wt%
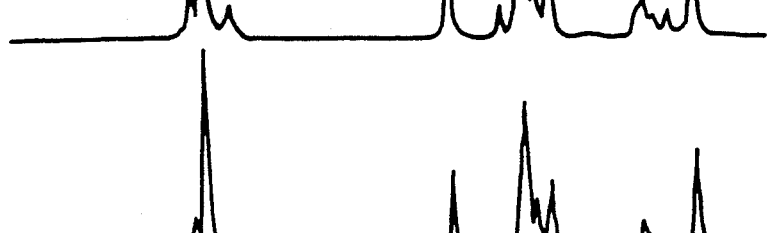
$2\theta°$ FIG. 10
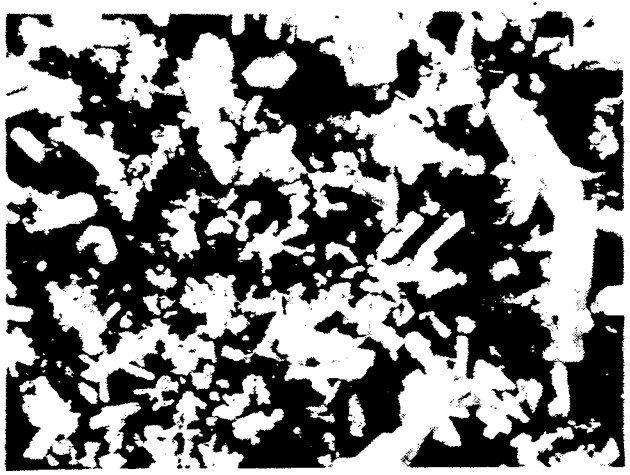
(×2000)
MICROGRAPH OF NEGATIVE ELECTRODE
OF BATTERY P (PRESENT INVENTION)
(×2000)
MICROGRAPH OF NEGATIVE ELECTRODE
OF BATTERY T (PRIOR ART)

PROCESS FOR PREPARING CADMIUM HYDROXIDE, AND ALKALINE SECONDARY BATTERY AND METHOD FOR CHARGING THE SAME

FIELD OF THE INVENTION

The present invention relates to a process for preparing cadmium hydroxide and to an alkaline secondary battery and a method for charging the same.

BACKGROUND OF THE INVENTION

Secondary batteries which have been generally used are mainly classified into two categories, namely, the categories of "lead battery" and "nickel-cadmium battery". In particular, the nickel-cadmium battery has been used widely because of its high-rate discharge characteristics, its long lifetime and so on, compared with the lead battery. On the other hand, development of a secondary battery capable of being charged in a short time and development of a high-capacity secondary battery have been demanded with the reduction of size and weight of electronic appliances in recent years.

A sealed nickel-cadmium battery has several problems with respect to the reduction of the charging period thereof and improvement in the capacity thereof.

The problem with respect to the reduction of the charging period is as follows.

It is known that the sealed nickel-cadmium battery can be sealed by so-called reserved cadmium hydroxide contained in negative electrode in an amount of electricity more than that of nickel hydroxide contained in the positive electrode. In an overcharge region oxygen gas is generated from the positive electrode before hydrogen gas is generated from the negative electrode. The oxygen gas is absorbed into the negative electrode by the reaction expressed by the following formula (1).

$$O_2 + H_2O + Cd \rightarrow Cd(OH)_2 \qquad (1)$$

As a result, the pressure of gas in the battery increases as the partial pressure of oxygen increases. If the pressure of gas is less than the pressure by which a safety valve of the battery is operated, there is no generation of hydrogen gas from the negative electrode, but there is generation of heat.

This means that the closed characteristic of the battery cannot be maintained if the magnitude of a charging current in the overcharge period is not more than a value corresponding to the oxygen gas absorbing rate into the negative electrode.

The method for charging the battery is mainly classified into two types, namely, a constant-current method, and a constant-voltage method, which is simpler in charging control than the former.

In general, the sealed nickel-cadmium battery is charged with a constant current, because the constant-voltage charging method used as a general method for the lead battery cannot be easily used for the sealed nickel-cadmium battery. The reasons are that the increase of the voltage of the sealed nickel-cadmium battery in the final charge stage is only from about 100 to about 150 mV, and that the increase of the voltage becomes smaller when the temperature is high or when the active material in the positive electrode is crystallized by aging phenomenon.

Therefore, the sealed nickel-cadmium battery must be charged with constant-current. And the value of charge current must be smaller than a value corresponding to the oxygen absorbing rate into the negative electrode. So that, the absorption of oxygen gas by the negative electrode must be improved in order to charge the sealed nickel-cadmium battery more rapidly. Because the oxygen gas absorbing rate into the negative electrode is proportional to the partial pressure of oxygen gas, the battery suitable for rapid charging is typically a cylindrical-form battery rather than a square-form battery. In the cylindrical-form battery, the charge is, however, limited to about 1 CA.

If the case of hydrogen gas is generated from the negative electrode in a charging period, the following disadvantage arises. A small part of the hydrogen gas can be absorbed with the positive electrode, but a large part of the hydrogen gas remains in the battery, so that the partial pressure of oxygen gas decreases as a hydrogen gas is accumulated in the battery. When the internal pressure of the battery reaches the pressure at which the safety valve can be operated, the gas in the battery flows out. This means that the quantity of electrolyte is reduced, thereby lowering the capacity of the battery.

The problem with respect to improvement in energy density of the sealed nickel-cadmium battery is as follows.

The cause of prevention of the high capacity of the sealed nickel-cadmium battery is mainly in the cadmium electrode thereof. The cadmium electrode includes reserved cadmium hydroxide, non-chargeable cadmium hydroxide, and pre-charge metallic cadmium, as except the active material related to the charge/discharge reaction with the positive active material. In particular, the main cause is the reserved cadmium hydroxide.

As described above, the reserved cadmium hydroxide serves to maintain sealed condition of the battery. The quantity of the reserved cadmium hydroxide must be established to be more than a value for compensating the quantity of oxygen spent in oxidation of a nickel substrate in the positive electrode, the quantity of oxygen spent in oxidation of a separator, and the quantity of oxygen accumulated in the battery in an overcharge situation. In general, the theoretical capacity of the reserved cadmium hydroxide ranges from 40 to 100% of the theoretical capacity of the positive active material electrode, though it varies according to the quality of the separator, the form of the battery and the condition of use of the battery. The reserved cadmium hydroxide which does not contribute to the capacity of the battery is unwelcome from the point of view of the energy density of the battery, but is necessary for keeping the sealed condition of the battery.

Recently, a proposal has been made to solve the aforementioned problem in the nickel-cadmium battery (Japanese Patent Application No. 62-86582) The proposal relates to a battery having a cadmium negative electrode that have large hydrogen over-potential and includes little reserved cadmium hydroxide. According to the proposal, rapid charge without temperature compensation can be carried out by controlling the charge current with detecting the voltage change of battery in the final stage of the charging period. The voltage change of the battery in the final stage of the charging period is caused by the potential change to the hydrogen evolution of negative electrode. However, this proposal has a disadvantage in that the discharge capacity of the battery is lowered in repetition of charge/discharge cycles, in particular, at a low temperature because the charging efficiency of the negative electrode is not so great.

After the above proposal, another proposal has been made to improve the charging efficiency of the negative electrode by adding nickel hydroxide or nickel oxide (Japanese Patent Application No. 63-13345.) According to this proposal, the change in the discharge capacity during the charge/discharge cycles of the battery can be improved remarkably compared with the prior proposal. However, the battery has two disadvantages, as follows. The first disadvantage is in that the hydrogen over-potential of the negative electrode is lowered by addition of nickel hydroxide. This is undesirable in that when the battery is charged with a constant voltage, the range of the allowed voltage becomes narrow. The second disadvantage is in that the theoretical capacity density of the cadmium negative electrode is lowered by addition of nickel hydroxide.

One of the methods for improving the charging efficiency without reduction of the hydrogen over-potential of cadmium electrode comprises preparing cadmium hydroxide contained in the cadmium negative electrode in the form of $\gamma$-Cd(OH)$_2$. In general, cadmium hydroxide contained in the cadmium negative electrode is $\beta$-Cd(OH)$_2$. As reported in the 15th International Power Source Symposium, P1 (1986), in the Journal of Electrochemical Society, 117, 583 (1970), in the Journal of Applied Chemistry U.S.S.R., 50, 2251 (1976) and in the Journal of Applied Chemistry U.S.S.R., 51, 1846 (1978), it is known that $\gamma$-Cd(OH)$_2$ is produced temporarily under certain conditions, viz., only in the case where the atmospheric temperature is low, or in the case where an electrolytic solution containing sodium hydroxide is used.

However, no process for producing $\gamma$-Cd(OH)$_2$ stably, easily, and quantitatively has been established. Therefore, performance of a battery using $\gamma$-Cd(OH)$_2$ as negative active material has been unknown.

SUMMARY OF THE INVENTION

An object of the present invention is to provide a process for preparing $\gamma$-Cd(OH)$_2$ which is useful as an active matter in a cadmium negative electrode.

Especially, object of the invention is to provide the alkaline secondary battery that has high reliability and able rapid charging by detecting the rise of charge voltage of battery as simple method of charge control system.

The present invention is based on the finding that $\gamma$-Cd(OH)$_2$ is produced by hydration of cadmium oxide with the presence of hydroxyethylcellulose and that $\gamma$-Cd(OH)$_2$ is very good as an negative active material.

Further, the invention is based on the finding that the performance of alkaline secondary battery having cadmium electrode including $\gamma$-Cd(OH)$_2$ was improved remarkably compared with the conventional battery.

The process for preparing $\gamma$-Cd(OH)$_2$ according to the present invention is as follows.

(A) Reaction is caused between cadmium oxide and an alkaline aqueous solution or water containing hydroxyethylcellulose dissolved therein.

(B) Reaction is caused between a mixture of hydroxyethylcellulose and cadmium oxide, and an alkaline aqueous solution containing sodium hydroxide.

The quantity of $\gamma$-Cd(OH)$_2$ produced can be controlled by adjusting the quantity of addition of hydroxyethylcellulose, the concentration of the alkaline aqueous solution or the presence of metallic cadmium with hydration of cadmium oxide.

In accordance with the invention, a cadmium electrode containing $\gamma$-Cd(OH)$_2$ as an active material is provided, and the quantity of cadmium hydroxide contained in the negative electrode is established to be not more than a value corresponding to the capacity of the positive active material. Accordingly, the change of potential corresponding to the evolution of a hydrogen gas from the negative electrode occurs just about the time that the charge of the positive electrode is finished. As a result, the battery according to the invention sharply shows the very large change of the charged voltage compared with the conventional alkaline secondary battery. Furthermore, the battery shows stable capacity in spite of repetition of charge/discharge cycles.

In another aspect, the present invention relates to a nickel-cadmium alkaline secondary battery having a nickel hydroxide positive electrode and a cadmium negative electrode, in which the weight of cadmium hydroxide contained in the negative electrode is not more than 0.95 times as much as the weight of nickel hydroxide contained in the positive electrode, and in which $\gamma$-Cd(OH)$_2$ exists in the negative electrode. Further embodiments of the invention, as described hereinafter, relate to a manganese dioxide-cadmium alkaline secondary battery, and to a silver oxide-cadmium alkaline secondary battery.

Also according to the invention, superspeed charge with 1 CA or more can be carried out.

BRIEF DESCRIPTION OF THE DRAWINGS

FIG. 1 is a view of X-ray diffraction analysis for comparison between crystal structures of cadmium hydroxides prepared by various processes.

FIGS. 3 and 4 are views of X-ray diffraction analysis showing the influence of the quantity of addition of hydroxyethylcellulose on the production of $\gamma$-Cd(OH)$_2$.

FIG. 10 is electron micrograph of crystal forms of active materials in negative electrodes for comparison between nickel-cadmium batteries as an example according to the invention and as a comparative example.

DETAILED DESCRIPTION OF THE INVENTION

Figure 2:
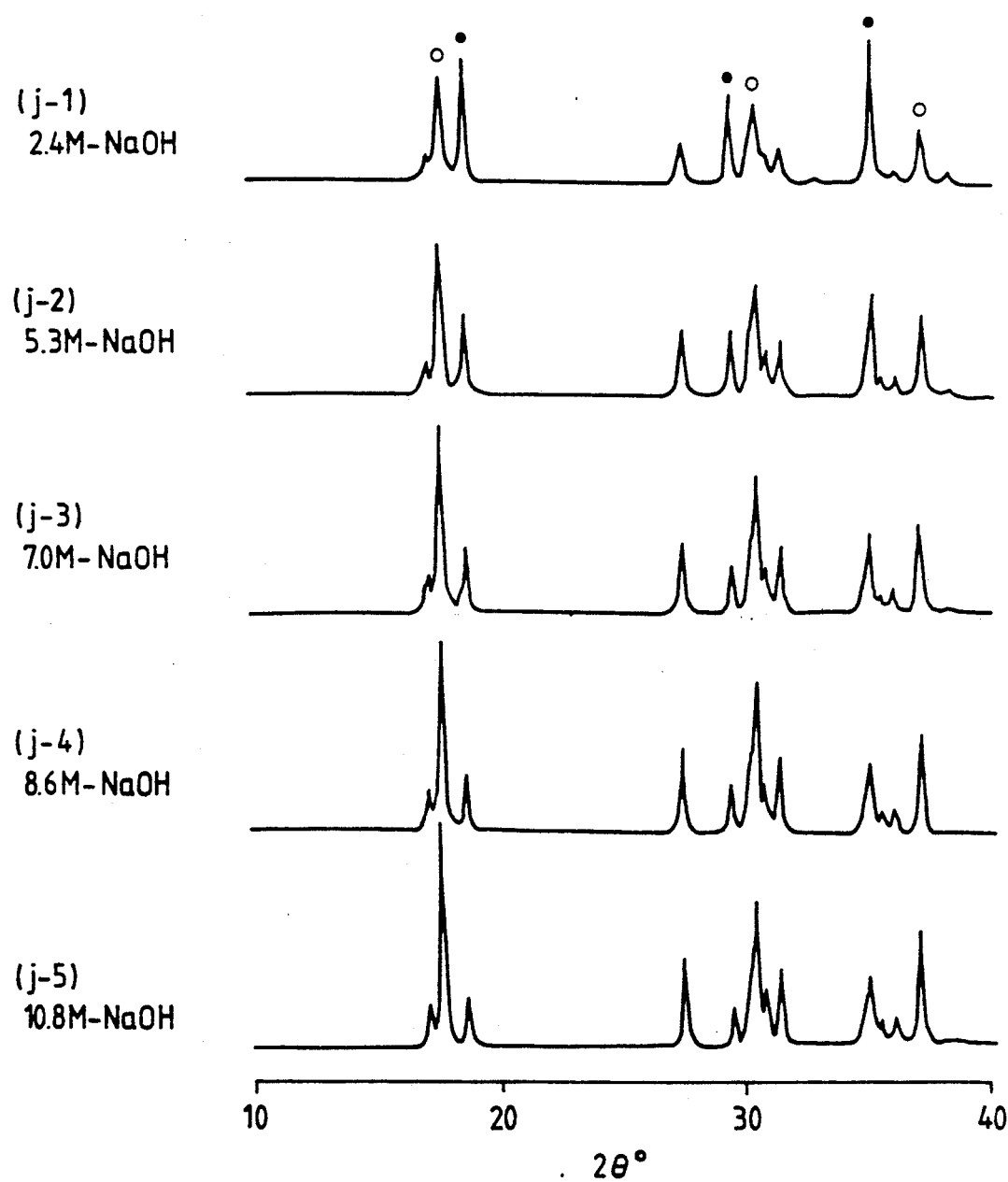
FIG. 2 is a view of X-ray diffraction analysis showing the influence of the concentration of the sodium hydroxide aqueous solution on the production of $\gamma$-Cd(OH)$_2$.

The invention is further described hereunder, including with respect to preferred embodiments thereof.

The invention is based on the fact that $\gamma$-Cd(OH)$_2$ is produced in the presence of hydroxyethylcellulose when cadmium oxide is changed to cadmium hydroxide by reaction with water. The quantity of $\gamma$-Cd(OH)$_2$ produced is affected by conditions in changing cadmium oxide to cadmium hydroxide. Accordingly, description and examples are set forth below with respect to the relation between the conditions for hydration of cadmium oxide and the products obtained.

Mainly, the following two types of cadmium electrodes are currently used.

One type is a sintered cadmium electrode prepared by a method comprising the steps of: impregnating a nickel sintered substrate with an aqueous solution of cadmium salt; and neutralizing the substrate in an alkaline aqueous solution. In this type negative electrode, the active material filled in the nickel sintered substrate is $\beta$-Cd(OH)$_2$.

The other type is a pasted cadmium electrode prepared through a process in which a collector is coated with active material paste consisting of active material powder, a binder, and a dispersing solvent. In this type negative electrode, cadmium oxide is mainly used as the active material powder. Cadmium oxide is changed to cadmium hydroxide by a reaction with water as represented by the following formula (2). The cadmium hydroxide thus obtained is, in general, $\beta$-Cd(OH)$_2$.

$$CdO + H_2O \rightarrow Cd(OH)_2 \quad (2)$$

In short, cadmium hydroxide contained in the conventional cadmium negative electrode is $\beta$-Cd(OH)$_2$.

On the contrary, it has been found that $\gamma$-Cd(OH)$_2$ is produced by reaction of cadmium oxide with water in the presence of hydroxyethylcellulose. Further details are described below, but basically, it has been found that this tendency to form $\gamma$-Cd(OH)$_2$ becomes more remarkable in the presence of metallic cadmium or in an alkaline aqueous solution, particularly, in a sodium hydroxide aqueous solution, and that this tendency becomes more remarkable in the case where cadmium oxide is immersed with an alkaline aqueous solution prepared by dissolving hydroxyethylcellulose therein.

Although the reason why $\gamma$-Cd(OH)$_2$ is produced in the presence of hydroxyethylcellulose cannot be said definitely, it is considered that $\gamma$-Cd(OH)$_2$ is produced more easily when hydroxyethylcellulose is present, judging from the following facts: $\gamma$-Cd(OH)$_2$ is produced easily in an alkaline aqueous solution rather than in neutral water; $\gamma$-Cd(OH)$_2$ is produced easily in the case where cadmium oxide is immersed in an alkaline aqueous solution prepared by dissolving hydroxyethylcellulose therein rather than in the case where a mixture of cadmium oxide and hydroxyethylcellulose is immersed in an alkaline aqueous solution; hydroxyethylcellulose is rapidly dissolved in an alkaline aqueous solution rather than in neutral water; and so on.

It is known that $\gamma$-Cd(OH)$_2$ is more active than $\beta$-Cd(OH)$_2$ and that $\gamma$-Cd(OH)$_2$ is more excellent in charging efficiency and discharge performance. The performance of $\gamma$-Cd(OH)$_2$ prepared by the aforementioned process is similar to but different from the performance of $\gamma$-Cd(OH)$_2$ reported in the prior art. The difference is in that $\gamma$-Cd(OH)$_2$ prepared by the aforementioned process has larger polarization in a charging period than $\beta$-Cd(OH)$_2$ and in that the crystal form of the $\gamma$-Cd(OH)$_2$ is maintained in spite of repetition of charge/discharge. In short, it is considered that $\gamma$-Cd(OH)$_2$ according to the present invention is different in performance from $\gamma$-Cd(OH)$_2$ reported in the prior art. Because the crystal form of the $\gamma$-Cd(OH)$_2$ is kept in spite of repetition of charge/discharge, a battery having a cadmium negative electrode containing the $\gamma$-Cd(OH)$_2$ is more excellent than the conventional battery in the following points.

The first point is that the cadmium negative electrode always has high charging efficiency and contains little non-chargeable cadmium hydroxide. In particular, in respect to the battery proposed in the Japanese Patent Application No. 62-83582, that is, in respect to the battery having a cadmium negative electrode containing little reserved cadmium hydroxide, thereby controlling charge through detecting the potential change to the hydrogen evolution of cadmium negative electrode as the change of charged voltage, the stable capacity of battery can be obtained without lowering of the voltage change of the battery in the last stage of the charging period as a disadvantage in the Japanese Patent Application No. 63-13345.

The second point is that the cadmium negative electrode always has high coefficient of utilization of the active material in a discharging period and low dependence on discharging rate, and, accordingly, that the battery containing the aforementioned $\gamma$-Cd(OH)$_2$ is excellent in performance in high-rate discharge compared with the conventional battery if the quantity of pre-charge metallic cadmium is not changed. If the performance in high-rate discharge is not changed, the quantity of pre-charge metallic cadmium can be decreased. Accordingly, the volume of the negative electrode can be reduced, so that capacity density per volume can be increased.

The alkaline battery according to the present invention can be produced easily with no special production process. The reason is based on the following facts: hydroxyethylcellulose is soluble in water, ethylene glycol, or the like, used as a dispersing solvent, and serves as a binder in the process of producing a pasted cadmium negative electrode; hydroxyethylcellulose is soluble in a high-concentration alkaline aqueous solution as an electrolytic solution in the alkaline secondary battery; and metallic cadmium powder is used as pre-charge metallic cadmium. In short, the battery can be produced by a process comprising the steps of: assembling battery parts, using a pasted cadmium electrode containing cadmium oxide, metallic cadmium, and hydroxyethylcellulose, and an electrolytic solution containing sodium hydroxide; and sealing the battery parts. Alternatively, a process may be used comprising the steps of: assembling battery parts by use of a pasted cadmium negative electrode containing cadmium oxide and metallic cadmium and an electrolytic solution containing hydroxyethylcellulose; and sealing the battery parts.

As another process, the battery can be assembled by use of a pasted cadmium negative electrode treated in the form of a single plate in an electrolytic solution containing hydroxyethylcellulose.

Proposals for hydroxyethylcellulose have been made in Japanese Patent Unexamined (Kokai) Publication Nos. 61-240577 and 61-240579 and U.S. Pat. 4,172,184. According to the Japanese Patent Unexamined Publication (Kokai) Nos. 61-240577 and 61-240579, hydroxyethylcellulose is added to a cadmium electrode. According to the U.S. Pat. 4,172,184, hydroxyethylcellulose is added to an alkaline electrolyte. However, the effect by hydroxyethylcellulose has not been described definitely in these proposals, and beneficial effects have not been obtained sufficiently.

The reason is believed to be as follows. In the Japanese Patent Unexamined Publication Nos. 61-240577 and 61-240579, the performance of the cadmium electrode containing hydroxyethylcellulose and cadmium oxide is estimated in a potassium hydroxide aqueous solution. However, the performance is not concerned with the property of $\gamma$-Cd(OH)$_2$.

On the other hand, in the U.S. Pat. 4,172,184, an electrolytic solution containing 2% of hydroxyethylcellulose is used in the form of gel for a primary battery. However, the excellent charge/discharge performance of the cadmium negative electrode based on the property of $\gamma$-Cd(OH)$_2$ cannot be utilized for a secondary battery.

The present invention is based on investigation of various factors influencing the quantity of $\gamma$-Cd(OH)$_2$ produced when cadmium oxide is hydrated in the presence of hydroxyethylcellulose. As a result, compared with the conventional process, the quantity of $\gamma$-Cd(OH)$_2$ produced can be improved greatly, to sufficiently bring out the desirable properties thereof.

The invention is not limited to nickel-cadmium batteries and can be applied to any alkaline secondary battery having a cadmium electrode. Further, the invention is not limited to batteries using paste-type cadmium electrodes and can be applied to batteries having cadmium electrodes, such as pocket-type electrodes, press-type electrodes and roll-type electrodes, containing cadmium oxide as an active matter. Further, the invention can be applied to batteries using sinter-type cadmium negative electrodes if cadmium oxide can be produced in the negative electrodes by heat treatment or the like.

EXAMPLE 1

Active Material a: (Example of the Invention)

After 30 g of cadmium oxide powder was put into 200 ml of 6M potassium hydroxide aqueous solution containing 0.2 g/l (liter) of hydroxyethylcellulose (trademark: NATROSOL 250LR, made by Hercules Inc.), the resulting mixture was left for 24 hours to change the greater part of cadmium oxide to cadmium hydroxide. Then, the resulting mixture was washed, dried and milled to prepare an active material a. The quantity of addition of hydroxyethylcellulose in the process of preparation of the active material was 0.1% by weight based on the weight of cadmium oxide.

Active Material b: (Example of Invention)

An active material b was prepared in the same manner as the active material a, except that the quantity of addition of hydroxyethylcellulose into 6M potassium hydroxide in the process of preparation of the active material a was changed to 4 g/l. The quantity of addition of hydroxyethylcellulose was 2.7% by weight based on the weight of cadmium oxide.

Active Material c: (Example of Invention)

After 30 g of cadmium oxide powder was put into 200 ml of water containing 4 g/l of hydroxyethylcellulose, the resulting mixture was left for 24 hours to change the greater part of cadmium oxide to cadmium hydroxide. Then, the resulting mixture was washed, dried and milled to prepare an active material c. The quantity of addition of hydroxyethylcellulose was 2.7% by weight based on the weight of cadmium oxide.

Active Material d: (Comparative Example)

After 45 g of ethylene glycol prepared by dissolving 0.2 g of hydroxyethylcellulose therein and 100 g of cadmium oxide powder were mixed to form paste, the resulting mixture was dried and immersed in 1 l of 6M potassium hydroxide aqueous solution for 24 hours to change the greater part of cadmium oxide to cadmium hydroxide. Then, the resulting mixture was washed, dried and milled to prepare an active material d.

Active Material e: (Example of the Invention)

An active material e was prepared in the same manner as the active material d, except that the potassium hydroxide aqueous solution used in the process of preparation of the active material d Was replaced by 1 l of 7M sodium hydroxide aqueous solution.

Active Material f: (Comparative Example)

After 40 g of aqueous solution prepared by dissolving 0.2 g of hydroxyethylcellulose and 0.4 g of sodium bitartrate therein and 100 g of cadmium oxide powder were mixed to form paste, the resulting mixture was dried and immersed in 1 l of 6M potassium hydroxide aqueous solution for 24 hours to change the greater part of cadmium oxide to cadmium hydroxide. Then, the resulting mixture was washed, dried and milled, to thereby prepare an active material f.

Active Material g: (Example of the Invention)

An active material g was prepared in the same manner as the active material f, except that the potassium hydroxide aqueous solution used in the process of preparation of the active material was replaced by 1 l of 7M sodium hydroxide aqueous solution.

Active material h: (Example of the Invention)

After 45 g of ethylene glycol prepared by dissolving 0.2 g of hydroxyethylcellulose therein, 100 g of cadmium oxide powder and 20 g of metallic cadmium powder were mixed to form paste, the resulting mixture was dried and immersed in 1 l of 6M potassium hydroxide aqueous solution for 24 hours to change the greater part of cadmium oxide to cadmium hydroxide. Then, the resulting mixture was washed, dried and milled to thereby prepare an active material h.

Active Material i: (Comparative Example)

After 30 g of cadmium oxide powder was put into 200 ml of 6M potassium hydroxide aqueous solution, the resulting mixture was left for 24 hours to change the greater part of cadmium oxide to cadmium hydroxide. Then, the resulting mixture was washed, dried and milled to prepare an active material i.

The quantity of addition of hydroxyethylcellulose in each of the processes of preparation of the active material d, e, f, g and h was 0.2% by Weight based on the weight of cadmium oxide.

Then, X-ray diffraction patterns of these active materials were measured. The X-ray diffraction patterns of these active materials are shown in FIG. 1. The processes for preparing the active materials and the compositions of cadmium hydroxide observed in the X-ray diffraction patterns are shown in Table 1.

TABLE 1

Process of Preparing Cadmium Hydroxide and Crystal Form of Cadmium Hydroxide

| Active matter | Raw material mix (wt. part) | | | | | | Kind of aqueous solution | Amounts HEC addition | Identify by X-ray diff. analysis |
|---|---|---|---|---|---|---|---|---|---|
| | CdO | Cd | HEC | SBT | EG | Water | | | |
| a | 30 | | | | | | HEC + KOH | 0.1 wt % | $\beta + \gamma$ |
| b | 30 | | | | | | HEC + KOH | 2.7 wt % | $\beta$(W) + $\gamma$(S) |
| c | 30 | | | | | | HEC + water | 2.7 wt % | $\beta$(W) + $\gamma$(S) |
| d | 100 | | 0.2 | | 44.8 | | KOH | 0.2 wt % | $\beta$(S) + $\gamma$(W) |
| e | 100 | | 0.2 | | 44.8 | | NAOH | 0.2 wt % | $\beta$(W) + $\gamma$(S) |
| f | 100 | | 0.2 | 0.4 | | 39.4 | KOH | 0.2 wt % | $\beta$(S) + $\gamma$(W) |
| g | 100 | | 0.2 | 0.4 | | 39.4 | NaOH | 0.2 wt % | $\beta$(W) + $\gamma$(S) |
| h | 100 | 20 | 0.2 | | 44.8 | | KOH | 0.2 wt % | $\beta$(S) + $\gamma$(W) |
| i | 30 | | | | | | KOH | 0 wt % | $\beta$ |

CdO: Cadmium oxide powder,
Cd: Metal cadmium powder,
SBT: Sodium bitartrate,
HEC: Hydroxyethylcellulose,
EG: Ethylene glycol.
(W): Weak diffraction pattern,
(S): Strong diffraction pattern It is apparent from Table 1 that $\gamma$-Cd(OH)$_2$ is produced when cadmium oxide is hydrated in the presence of hydroxyethylcellulose.

The following facts are found by comparing the quantities of produced $\gamma$-Cd(OH)$_2$ in the X-ray diffraction patterns of these active materials.

The first fact is that the quantity of $\gamma$-Cd(OH)$_2$ produced is increased by the process of immersing the cadmium oxide in an alkaline aqueous solution containing hydroxyethylcellulose dissolved therein, rather than the process of immersing a mixture of cadmium oxide and hydroxyethylcellulose in an alkaline aqueous solution. This fact is found by comparison between the X-ray diffraction patterns of the active material a (example of the invention) and d (as a comparative example).

The second fact is that the quantity of $\gamma$-Cd(OH)$_2$ produced is increased by the process of hydrating cadmium oxide in a sodium hydroxide aqueous solution, rather than the process of hydrating cadmium oxide in a potassium hydroxide aqueous solution. This fact is found by comparison between the X-ray diffraction patterns of the active material e (example of the invention) and d (comparative example) and the active material g (example of the invention) and f (comparative example).

The third fact is that the quantity of $\gamma$-Cd(OH)$_2$ produced is increased in the case where the base material used includes cadmium oxide and metallic cadmium, rather than in the case where the base material used is only cadmium oxide. This fact is found by comparison between the X-ray diffraction patters of the active material h (example of the invention) and d (comparative example).

On the other hand, the following facts are found by comparing easiness of production of $\gamma$-Cd(OH)$_2$. The quantity of produced $\gamma$-Cd(OH)$_2$ increases as the quantity of addition of hydroxyethylcellulose increases. This fact is apparent from by comparison between the X-ray diffraction patterns of the active material a and b. The quantity of $\gamma$-Cd(OH)$_2$ produced is increased by the process of hydrating cadmium oxide in an alkaline aqueous solution, rather than the process of hydrating cadmium oxide in neutral water. This fact is apparent from comparison between the X-ray diffraction patterns of the active material b and c.

On the other hand, it is found that $\gamma$-Cd(OH)$_2$ is not affected by any dispersing solvent used for preparation of active material paste in the paste-type cadmium electrode and not affected by sodium bitartrate added when water is used as a dispersing solvent. This fact is apparent from comparison between the X-ray diffraction patterns of the active material d and f and the X-ray diffraction patterns of the active material e and g.

Sodium bitartrate is a matter for temporarily suppressing the reaction of hydration of cadmium oxide in the case where water is used as a dispersing solvent for active material paste.

As described above, it is apparent that the quantity of $\gamma$-Cd(OH)$_2$ produced is affected by factors such as the process of addition of hydroxyethylcellulose, the kind of aqueous solution used for hydration of cadmium oxide, the composition of active materials, and the like. Furthermore, the quantity of produced $\gamma$-Cd(OH)$_2$ is affected by other factors, such as the concentration of alkaline aqueous solution used for hydration of cadmium oxide, and the quantity of addition of hydroxyethylcellulose. The influence by these factors is described with reference to the following Examples 2 and 3.

EXAMPLE 2

This experiment shows the influence of the concentration of alkaline aqueous solution on the quantity of $\gamma$-Cd(OH)$_2$ produced. The active matter material used was a mixture of cadmium oxide powder and hydroxyethylcellulose. The alkaline aqueous solution used is a sodium hydroxide aqueous solution.

Active Materials Group j:

After 45 g of ethylene glycol prepared by dissolving 0.2 g of hydroxyethylcellulose therein and 100 g of cadmium oxide powder were mixed to form paste, the resulting mixture was dried and immersed, each in 1 l of five concentrations, from 2.4M to 10.8M, of sodium hydroxide aqueous solutions for 24 hours, to change the greater part of cadmium oxide to cadmium hydroxide. Then, the resulting mixtures were washed, dried and milled to prepare a group j of active materials.

The X-ray diffraction patterns of the group j of five active materials are shown in FIG. 2. It is apparent from FIG. 2 that a large quantity of $\gamma$-Cd(OH)$_2$ can be produced in any case of the sodium hydroxide concentration. Further, it was found that the quantity of produced $\gamma$-Cd(OH)$_2$ increases as the sodium hydroxide concentration increases. Judging from these facts, it is preferable that the concentration of sodium hydroxide used for hydration of cadmium oxide is not less than 2.4M.

EXAMPLE 3

In this example, the influence of the quantity of addition of hydroxyethylcellulose on the quantity of produced $\gamma$-Cd(OH)$_2$ is described with reference to the following two cases.

The first case is that the active materialized is only cadmium oxide and that the aqueous solution used for hydration of cadmium oxide is selected from 6M potassium hydroxide solutions prepared by dissolving various quantities of hydroxyethylcellulose therein. The second case is that the active material used is selected from mixtures of cadmium oxide and various quantities of hydroxyethylcellulose, and that the aqueous solution used for hydration of cadmium oxide is a 7M sodium hydroxide aqueous solution.

Active Materials Group k:

After 30 g of cadmium oxide powder was put into each 200 ml of 6M potassium hydroxide aqueous solutions prepared by dissolving various quantities, from 0.5 to 50 g/l, of hydroxyethylcellulose therein, the respective resulting mixtures were immersed for 24 hours to change the greater part of cadmium oxide to cadmium hydroxide. Then, the resulting mixtures were washed, dried and milled to prepare a group k of active materials.

Active Materials Group l:

After 45 g of ethylene glycol prepared by dissolving various quantities, from 0.2 to 2 g, of hydroxyethylcellulose therein and 100 g of cadmium oxide powder were mixed to form paste, the respective resulting mixtures were immersed in each 1 l of 7M sodium hydroxide aqueous solution for 24 hours to change the greater part of cadmium oxide to cadmium hydroxide. Then, the resulting mixtures were washed, dried and milled to prepare a group l of active materials.

The X-ray diffraction patterns of the group k of active Materials are shown in FIG. 3. The X-ray diffraction patterns of the group l of active materials are shown in FIG. 4.

It is apparent from FIG. 3 that all of the active matters contained mainly $\gamma$-Cd(OH)$_2$, and that the influence of the quantity of addition of hydroxyethylcellulose is little in the range of from 0.5 g/l to 50 g/l. Judging from the X-ray diffraction pattern of the active material a in FIG. 1, it is considered that $\gamma$-Cd(OH)$_2$ can be produced even if the quantity of addition of hydroxyethylcellulose is not more than 0.2 g/l.

It is apparent from these facts that an active material mainly containing $\gamma$-Cd(OH)$_2$ can be prepared if the quantity of addition of hydroxyethylcellulose is not less than 0.2 g/l.

On the other hand, the following facts are found from FIG. 4. It is apparent that $\gamma$-Cd(OH)$_2$ can be found in all of the active matters and that the quantity of produced $\gamma$-Cd(OH)$_2$ increases as the quantity of addition of hydroxyethylcellulose increases. Further, it is apparent that $\gamma$-Cd(OH)$_2$ is produced as a main active material when the quantity of addition of hydroxyethylcellulose is not less than 0.2% by weight based on the weight of cadmium oxide.

Judging from these facts, the quantity of addition of hydroxyethylcellulose is, preferably, not less than 0.02% by weight based on the weight of cadmium oxide. When the quantity is, in particular, not less that 0.2% by weight, an active material mainly containing $\gamma$-Cd(OH)$_2$ can be produced.

The influences of the respective factors on production of $\gamma$-Cd(OH)$_2$ have been described with reference to the aforementioned three experiments. The point of importance herein is that the electrochemical properties of $\gamma$-Cd(OH)$_2$ are very excellent. In the following, the charge/discharge performance of $\gamma$-Cd(OH)$_2$ is therefore described.

EXAMPLE 4

In this experiment, the electrochemical property of $\gamma$-Cd(OH)$_2$ was examined with use of press-type cadmium electrodes, by which the influence of impurities could be reduced most.

Negative Electrode m: (Example of the Invention)

After 273 mg (theoretical capacity: 100 mAh) of the active material (K-2) prepared in Example 3 and 210 mg (theoretical capacity: 100 mAh) of metallic cadmium powder were mixed, pressure of 230 kg/cm$^2$ was applied to the resulting mixture to form a tablet. Then, the tablet was covered with a copper net of 20 mesh and then a lead portion was attached thereto to thereby prepare a cadmium electrode. The cadmium electrode was named as "negative electrode m".

Negative Electrode n: (Conventional Example)

After 273 mg (theoretical capacity: 100 mAh) of the active material i prepared in Example 1 and 210 mg (theoretical capacity: 100 mAh) of metallic cadmium powder were mixed, pressure of 230 kg/cm$^2$ was applied to the resulting mixture to form a tablet. Then, the tablet was covered with a copper net of 20 mesh and then a lead portion was attached thereto to thereby prepare a cadmium electrode. The cadmium electrode was named as "negative electrode n".

The addition of metallic cadmium powder into the negative electrodes m and n was made for the following reason. If the active material used is formed of only cadmium hydroxide powder, the tablet-type active material of the press-type electrode is disintegrated when immersed in the electrolyte because the form thereof cannot be kept. However, the addition of metallic cadmium powder can prevent the disintegration of the active matter. In short, metallic cadmium was used for the double purpose of pre-charge and keeping the form of the electrode. The charge/discharge performance of the cadmium electrode was measured with use of two nickel flat plates as a counter electrode in a 6M potassium hydroxide aqueous solution by the following method. In a first cycle, the respective negative electrode was charged with a current of 0.1 CA, that is, 10 mA, for 15 hours by reference to the theoretical capacity of cadmium hydroxide contained in the negative electrode, and then discharged with a current of 1 CA, that is 100 mA for 60 minutes. Then, in a second cycle, the negative electrode was charged with various currents of 1 CA, 10 CA and 20 CA, that is, 100 mA, 1 A and 2 A, until the continuous generation of hydrogen gas was observed. From the quantity of electricity charged at the point of time the generation of hydrogen gas was started, the charging efficiency of the negative electrode was calculated according to the following formula (3).

$$\text{Charging Efficiency (\%)} = \frac{\text{Electricity charged without Generation of Hydrogen Gas}}{\text{Theoretical Capacity of Cadmium Active Material Discharged}} \times 100 \quad (3)$$

The results are shown in Table 2.

TABLE 2

| Negative electrode | Charging Efficiency (%) |  |  |
|---|---|---|---|
|  | Charging efficiency |  |  |
|  | 1 CA | 10 CA | 20 CA |
| m | 99.8 | 95.5 | 91.7 |
| n | 92.5 | 84.7 | 77.8 |

It is apparent from Table that the negative electrode m has excellent charging efficiency compared with negative electrode n, and that the charging efficiency shows a very high value of not less than 90% when the press-type cadmium electrode having lower collecting property than the paste-type or sinter-type electrode is charged with 20 CA. Consequently, the charging efficiency of the negative electrode containing $\gamma$-Cd(OH)$_2$ is very excellent.

Figure 5:
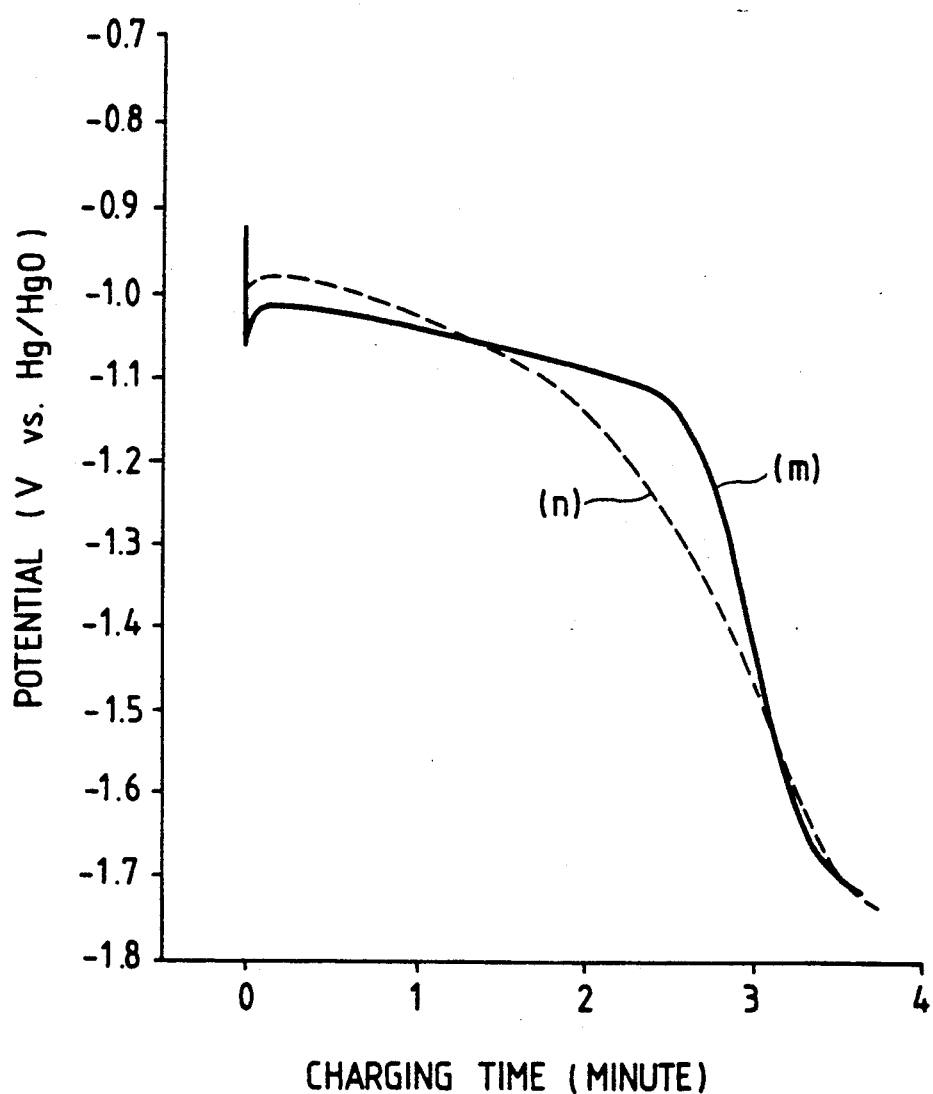
FIG. 5 is a view for comparison between charging characteristics of negative electrodes.

The potential behavior of the negative electrode m and n charged with 20 CA are shown in FIG. 5. It is apparent from FIG. 5 that the negative electrode m has potential behavior such that the potential is flat in a charging period but changes sharply at the point of time a hydrogen gas is generated in the last stage of the charging period, compared with the negative electrode n. However, a different point from the characteristic reported in the prior art is found.

The different point is that the polarization of the negative electrode m in the early stage of the charging period is larger than that of the negative electrode n. This tendency can be found regardless of the magnitude of the charging current. Further, the following tendency on the polarization of the negative electrode m in the charging period can be found through another experiment.

Figure 6:
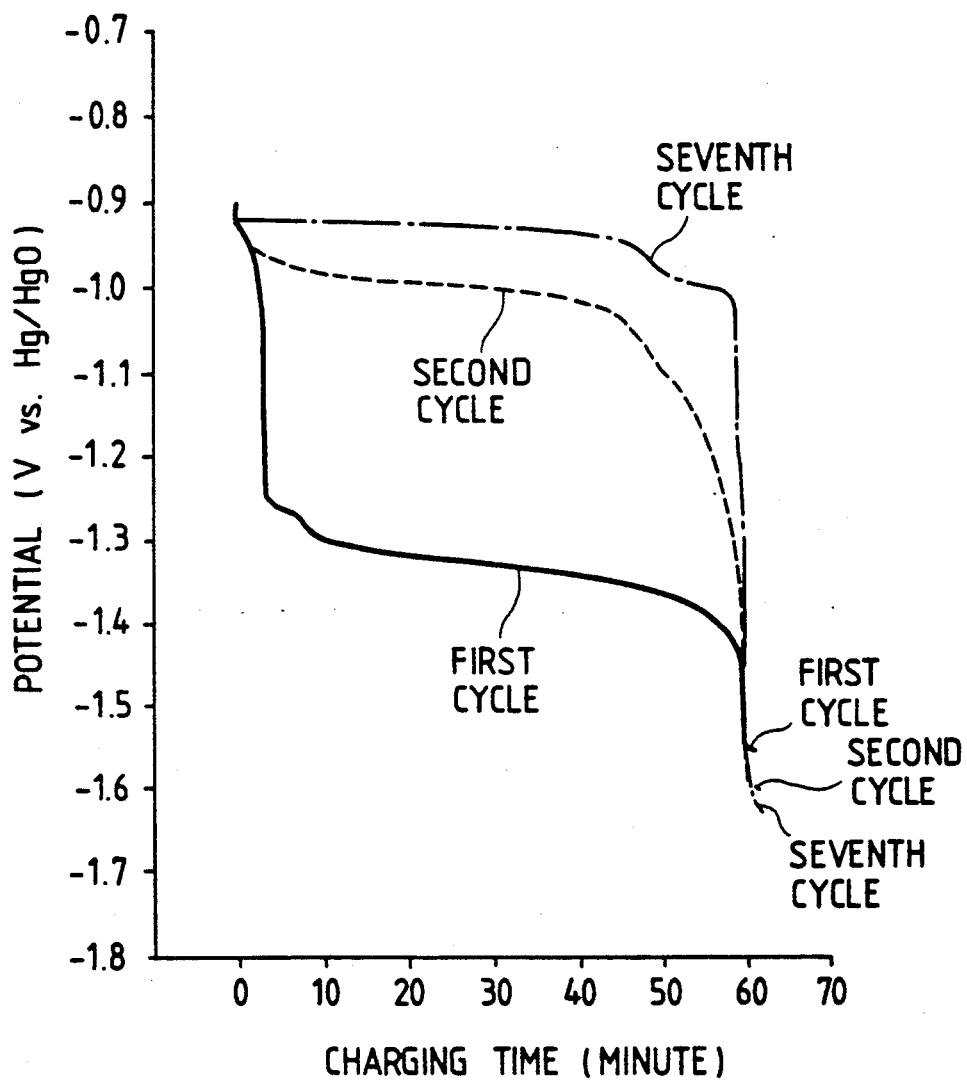
FIG. 6 is a view showing the change of charging characteristic of a negative electrode in charge/discharge cycles.

FIG. 6 shows potential behaviors during charge in first, second and seventh cycles when the negative electrode m is charged/discharged with a current of 100 mA (CA). It is apparent from FIG. 6 that the intermediate potential of the negative electrode m in a first-cycle charging period is about $-1.33$ V by reference to the mercury oxide electrode, and that the polarization of the negative electrode m is very large because the intermediate potential of the negative electrode is measured to be about $-0.99$ V in the same experiment, and accordingly, the difference between the intermediate potential of the negative electrodes m and n is not less than about 0.3 V. However, the polarization decreases with repetition of cycles, so that there arises little disadvantage. When the charging current in the first cycle is established to be larger that 1 CA, the polarization increases so greatly that hydrogen gas is undesirable generated in the charging period. As described above, it is necessary that the charging current in the first cycle be established to be not more that 1 CA by reference to the theoretical capacity of cadmium hydroxide contained in the cadmium negative electrode.

In the following, the discharge performance is described.

In the same manner as in the measurement of charging efficiency, the negative electrodes m and n were respectively charged with a current of 10 mA for 15 hours, and the discharged to be $-0.5$ V by reference to the mercury oxide electrode with various currents of 1 CA, 3 CA and 5 CA, that is 0.1 A, 0.3 A and 0.5 A, based on the theoretical capacity of cadmium hydroxide contained in the electrodes. Utilization of the active material based on the theoretical capacity of cadmium hydroxide contained in the electrodes are shown in Table 3.

TABLE 3

| Negative electrode | Active Matter Utilization Rate (%) |  |  |
|---|---|---|---|
|  | Discharge Rate (%) |  |  |
|  | 1 CA | 3 CA | 5 CA |
| m | 129.4 | 101.6 | 86.8 |
| n | 108.2 | 75.0 | 49.0 |

It is apparent from Table 3 that the negative electrode m using $\gamma$-Cd(OH)$_2$ have high utilization of the active material and low in the decrease of utilization of the active material with the increase of discharging rate, that is, low in dependency of discharge rate compared with the negative electrode n. As described above, the negative electrode m is excellent in the rate of utilization of the active material in the discharging period and excellent in dependency on discharge rate caused by main product $\gamma$-Cd(OH)$_2$. Utilization of active material can take a value over 100%, as shown in Table 3, because pre-charge metallic cadmium provided for the purpose of keeping the form of the electrode is involved in discharge.

Figure 7:
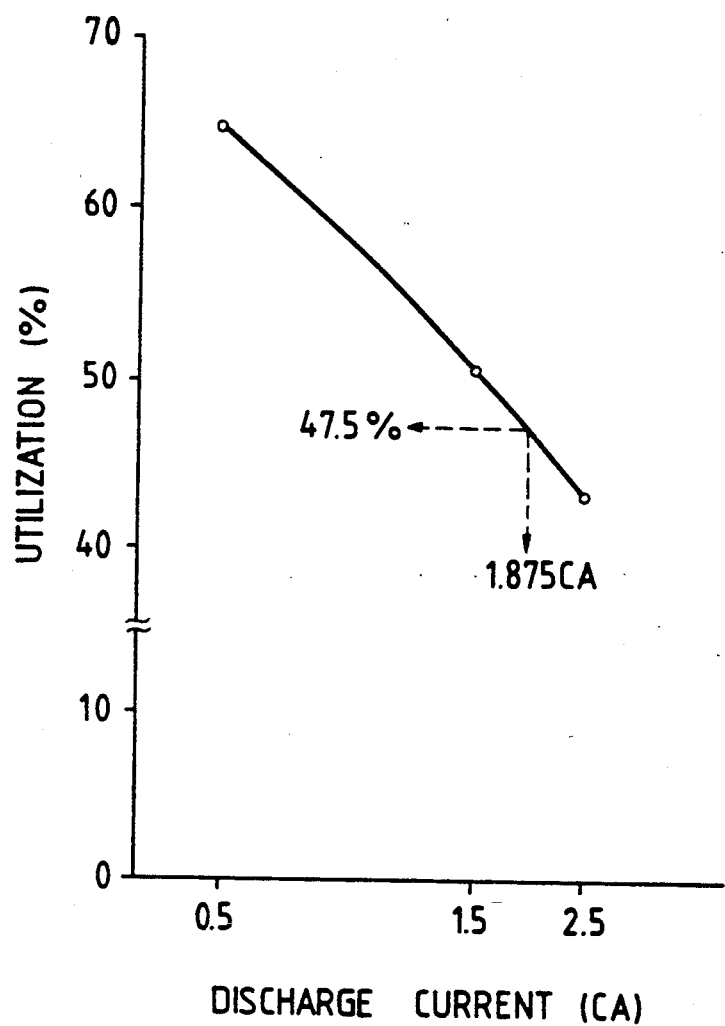
FIG. 7 is a view for explaining an improvement in the capacity of a battery according to the present invention.

In the following, improvement of energy density of battery is described with reference to the numerical values shown in Table 3. It is apparent from Table 3 that the negative electrode n can be discharged by 75 mAh when the discharging current is 300 mA. When the theoretical capacity of the active material to obtain the discharge capacity of the negative electrode m of 5 mAh under the discharge condition of 300 mA is calculated based on the rate of utilization of the active material in the discharging period, it will be understood that 80% of the negative electrode suffices the value thereof. Accordingly, the discharge capacity of the negative electrode m under the discharge current of 300 mA is 76 mAh when the theoretical capacity of all cadmium contained in the negative electrode m is 160 mAh. This value can be verified as follows. Because the values shown in Table 3 are calculated based on the theoretical capacity of the cadmium hydroxide, utilization of active material are respectively half of the values shown in Table 3 when calculated based on the theoretical capacity of all cadmium, inclusive of pre-charge metallic cadmium. Accordingly, utilization of active material are 64.7% in the discharge condition of 100 mA (0.5 CA), 50.8% in the discharge condition of 300 mA (1.5 CA), and 43.4% in the discharge condition of 500 mA (2.5 CA). When these data are plotted on a semilogarithmic coordinate system with the discharge rate as the abscissa and utilization as the ordinate, a graph of utilization vs. discharge rate as shown in FIG. 7 can be obtained.

Utilization of the negative electrode m having the theoretical capacity of 160 mAh under the discharge condition of 300 mA (1.875 CA) is 47.5% when calculated from this graph. Accordingly, 47% of 160 mA is 76 mAh. It is apparent from this fact that 60 mAh is enough for the theoretical capacity of pre-charge metallic cadmium contained in the negative electrode m.

Because the theoretical capacity of pre-charge metallic cadmium contained in the negative electrode n is 100 mAh, the quantity of pre-charge metallic cadmium in the negative electrode m can be reduced to 40% based on the negative electrode n. This means that battery capacity is improved by about 10% by distributing the volume of disused metallic cadmium to positive and negative electrodes, as well as reducing battery material cost.

As described above, it will be understood that the cadmium electrode containing $\gamma$-Cd(OH)$_2$ is excellent in charge/discharge performance. Further, a battery having the cadmium electrode having such performance can be produced easily on the basis of the knowledge of obtained in Example 1. Processes for producing the battery are as follows.

(A) A process in which a battery is assembled with use of a cadmium electrode containing cadmium oxide and an alkaline electrolyte containing hydroxyethylcellulose, and the battery is sealed.

(B) A process in which a battery is assembled with use of a cadmium electrode containing cadmium oxide and hydroxyethylcellulose and an alkaline electrolyte mainly or subsidiarily containing sodium hydroxide, and then the battery is sealed.

(C) A process in which a cadmium negative electrode containing cadmium oxide is formed in ana alkaline electrolyte containing hydroxyethylcellulose, and the battery is assembled with use of the cadmium negative electrode.

(D) A process in which a cadmium negative electrode containing cadmium oxide and hydroxyethylcellulose is formed in an alkaline electrolyte mainly or subsidiarily containing sodium hydroxide, and then a battery is assembled with use of the cadmium negative electrode.

As described above clearly, the battery according to the present invention can be produced with little change of the conventional battery producing process. Further, the quantity of $\gamma$-Cd(OH)$_2$ produced can be increased by adding pre-charge metallic cadmium powder to the cadmium electrode in advance.

However, the quantity of addition of hydroxyethylcellulose must be considered in the case where the battery is assembled with use of an electrolyte prepared by dissolving hydroxyethylcellulose therein as in the process (A). The reason is that high-rate discharge performance as one of the effects of the invention cannot be easily obtained when the electrolyte contains 2 g/l or more of hydroxyethylcellulose. On the basis of the results of Example 3, the cause is considered to be, beside the active material of the negative electrode, that a large quantity of $\gamma$-Cd(OH)$_2$ is produced in the cadmium negative electrode. One of the reasons to be considered is that the viscosity of the electrolyte increases as the quantity of addition of hydroxyethylcellulose increases. In the case where the quantity of hydroxyethylcellulose added to the electrolyte is large, for example, 2% by weight, as in the process according to the U.S. Pat. No. 4,172,184, excellent high-rate discharge performance based on the properties of $\gamma$-Cd(OH)$_2$ cannot be obtained. Therefore, the following Example 5 illustrates the performance of the battery of the invention having a cadmium electrode containing $\gamma$-Cd(OH)$_2$, and the optimum range of the quantity of addition of hydroxyethylcellulose.

EXAMPLE 5

The alkaline secondary battery such as, for example, a nickel-cadmium battery containing $\gamma$-Cd(OH)$_2$ according to the present invention is superior to the conventional one in the following points.

The first point is that the battery having reserved cadmium hydroxide in the negative electrode has a large capacity, in particular, in high-rate discharge, due to the excellent discharge performance of the cadmium electrode containing $\gamma$-Cd(OH)$_2$.

The second point is that the battery having the negative electrode containing little reserved cadmium hydroxide to thereby detect the change of potential to hydrogen gas evolution from the negative electrode to thereby control charge is excellent in the capacity change in charge/discharge cycles. This is due to the excellent charging efficiency of $\gamma$-Cd(OH)$_2$, as well as that the battery has the same large capacity in high-rate discharge as that of the aforementioned battery. Furthermore, the battery according to the present invention is free from the lowering of the hydrogen overpotential of cadmium electrode as reported in the Japanese Patent Application No. 63-13345. The reason is that there is no necessity of addition of nickel hydroxide or other materials having the property to lower the hydrogen over-potential of cadmium electrode. This means that the voltage change of the battery of the invention in the last stage of the charging period is large and that the range of temperature allowed to be used in constant-voltage charge without temperature compensation is wide.

As described above clearly, the present invention has importance for a battery using a cadmium negative electrode, especially containing little reserved cadmium hydroxide. Therefore, this example illustrates the performance of the battery according to the invention with this type battery as an example.

The active material in the positive electrode of the alkaline secondary battery according to the invention is selected from nickel hydroxide, manganese dioxide, and silver oxide. Of these three active materials, nickel hydroxide is most generally used. Accordingly, the following description centers on a nickel-cadmium battery.

Battery O: (Example of the Invention)

Into 40 parts by weight of ethylene glycol containing 0.4 part by weight of hydroxyethylcellulose, 80 parts by weight of cadmium oxide powder, 20 parts by weight of metallic cadmium powder and 0.1 part by weight of polypropylene short fiber of 1 mm length were mixed to form paste. The paste was applied to a nickel-plated perforated steel sheet. Then, the paste was dried and pressed to prepare a 2.9×14.52 (mm) negative electrode having the theoretical capacity of cadmium oxide of 960 mAh.

On the other hand, a positive electrode was prepared as follows.

A sintered nickel substrate having the porosity of about 80% was impregnated with a mixture aqueous solution (pH=2, specific gravity: 1.50 (20° C.)) of cobalt nitrate having the cobalt content of 8% and nickel nitrate. Then the substrate was immersed in a sodium hydroxide aqueous solution having the specific gravity of 1.200 (20° C). Then, the substrate was washed with boiled water and dried. The aforementioned procedure was repeated to prepare a 1.4×14×52 (mm) positive electrode having the theoretical capacity of nickel hydroxide of 400 mAh.

Then, a negative electrode was covered with polysulfone nonwoven separator having a thickness of about 0.2 mm. Then, the negative electrode was put between two sheets of positive electrodes with use of an electrolytic solution consisting of 2.4 ml of a mixture aqueous solution containing a 6M potassium hydroxide aqueous solution and a 7M sodium hydroxide aqueous solution in the volume proportion 60/40, to thereby prepare a nickel-cadmium battery O having the nominal capacity of 700 mAh. Battery case consist of synthetic resin.

Battery P: (Example of the Invention)

Into 40 parts by weight of ethylene glycol containing 0.2 part by weight of polyvinyl alcohol, 80 parts by weight of cadmium oxide powder, 20 parts by weight of metallic cadmium powder and 0.1 part by weight of polypropylene short fiber of 1 mm length were mixed to form paste. The paste was applied to a nickel-plated perforated steel sheet. Then, the paste was dried and pressed to prepare a 2.9×14×52 (mm) negative electrode having the theoretical capacity of cadmium oxide of 960 mAh.

On the other hand, a positive electrode was prepared in the same manner as in the battery O A negative electrode was covered with polysulfone nonwoven separator having a thickness of about 0.2 mm. Then, the negative electrode was put between two positive electrodes using an electrolytic solution consisting of 2.4 ml of a 6M potassium hydroxide aqueous solution containing 1 g.l of hydroxyethylcellulose of thereby prepare a nickel-cadmium battery P having the nominal capacity of 700 mAh.

Battery Q: (Example of the Invention)

Into 40 parts by weight of ethylene glycol containing 0.2 part by weight of polyvinyl alcohol, 100 parts by weight of cadmium oxide powder and 0.1 part by weight of polypropylene short fiber of 1 mm length were mixed to form paste. The paste was applied to a nickel-plated perforated steel sheet. Then, the paste was dried and pressed to prepare a negative electrode. The negative electrode was formed or charged in a 6M potassium hydroxide aqueous solution containing 1 g/l of hydroxyethylcellulose to change 22% of the total amount of cadmium to metallic cadmium. Then, the negative electrode was washed, dried and pressed to prepare a 2.9×14×52 (mm) negative electrode having the total theoretical capacity of cadmium hydroxide and cadmium oxide of 960 mAh.

On the other hand, a positive electrode was prepared in the same manner as in the battery O.

A negative electrode was covered with polysulfone nonwoven separator having a thickness of about 0.2 mm. Then, the negative electrode was put between two positive electrodes with use of an electrolytic solution consisting of 2.4 ml of a 6M potassium hydroxide aqueous solution to thereby prepare a nickel-cadmium battery having the nominal capacity of 700 mAh.

Battery R: (Example of the Invention)

Into 40 parts by weight of water containing 0.4 part by weight of hydroxyethylcellulose and 0.4 part by weight of sodium bitartrate, 80 parts by weight of cadmium oxide powder, 20 parts by weight of metallic cadmium powder and 0.1 part by weight of polypropylene short fiber of 1 mm length were mixed to form paste. Thereafter, a nickel-cadmium battery R having the nominal capacity of 700 mAh was prepared in the same manner as the battery O.

Battery S: (Example of the Invention)

A nickel-cadmium battery S having the nominal capacity of 700 mAh was prepared in the same manner as the battery R, except that hydroxyethylcellulose used in the battery R was replaced by a separator having about 11 mg of hydroxyethylcellulose held therein. Although hydroxyethylcellulose, as described above, can be held in the separator other than the negative electrode and the electrolyte, it is found that the effect thereof in this case is inferior compared with the effect thereof in the case where hydroxyethylcellulose is held in the negative electrode or electrolyte.

Battery T: (Comparative Example)

A nickel-cadmium battery T having the nominal capacity of 700 mAh was Prepared in the same manner as the battery P, except that hydroxyethylcellulose used in the battery P was removed from the electrolyte.

The batteries thus prepared were respectively provided with safety valves which could be operated by a pressure of 0.1 kg/cm$^2$. These batteries have little reserved cadmium hydroxide. In each of the batteries, the weight of cadmium hydroxide in the negative electrode was about 0.95 times (2.73(g/Ah)/2.88(g/Ah)) as much as the weight of nickel hydroxide in the positive electrodes. When cadmium oxide in the negative electrodes of the batteries O, P, R, S and T was brought into contact with the electrolyte, water was spent by the reaction as represented by the formula (2). Therefore, excessive water corresponding to the amount of such spending was injected into these batteries.

Then, one-cycle forming charge/discharge was applied to the respective batteries at an atmospheric temperature of 20° C. Then, the batteries were charged with a maximum current of 0.1 CA and a constant voltage of 1.6 V for 20 hours. Then, the batteries were discharged with various currents of 0.2 CA, 1 CA and 3 CA to measure discharge characteristics. The reason why the maximum charging current was limited to a small value of 0.1 CA and why the charging period was established to be a large value of 20 hours was for reducing the influence due to differences in charging efficiency between the negative electrodes.

Figure 8:
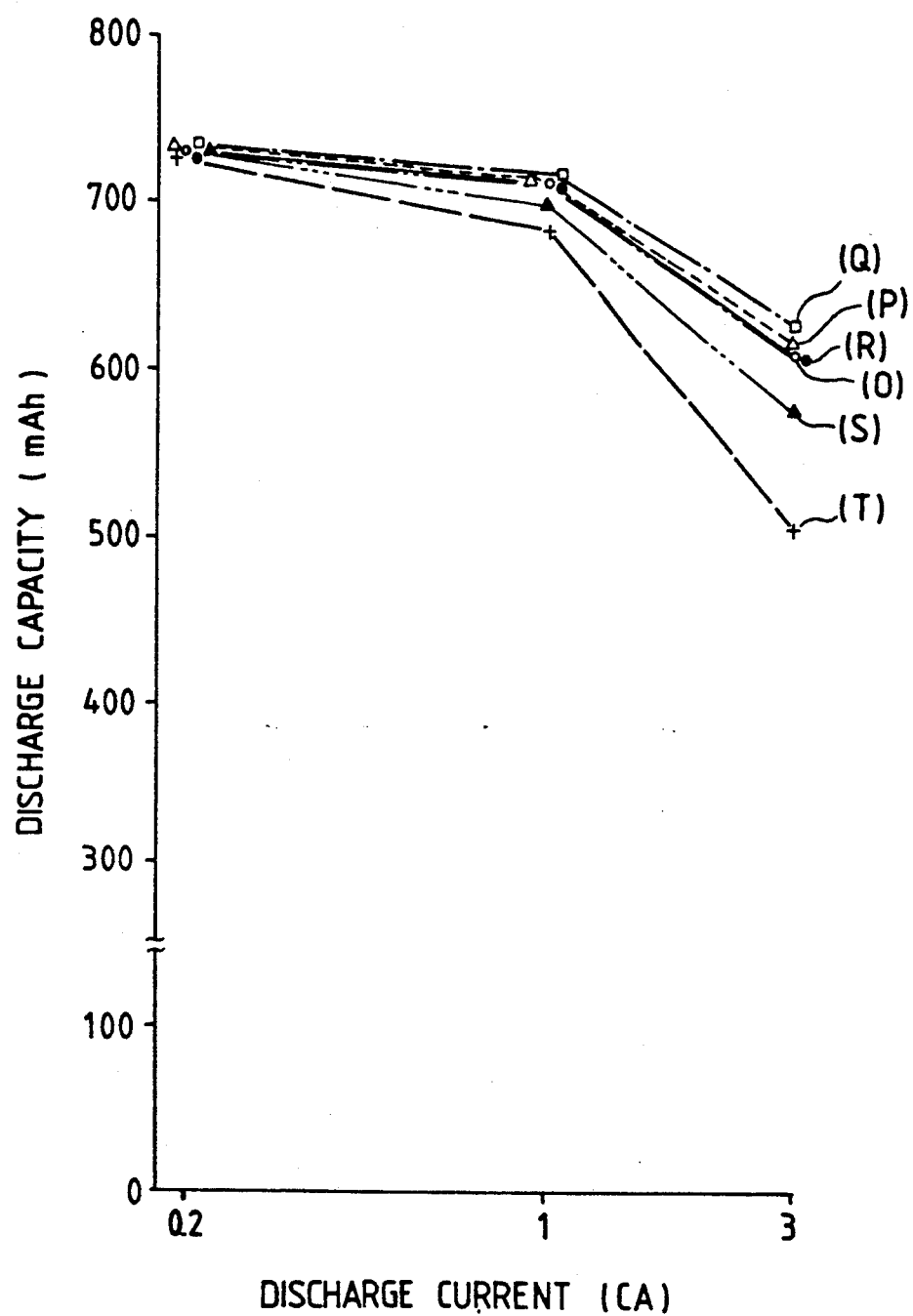
FIG. 8 is a view for comparison in discharge capacity between nickel-cadmium batteries as an example according to the invention and as a comparative example.

Discharge capacities and the respective discharge rates are shown in FIG. 8. It is apparent from FIG. 8 that the batteries O, P, Q, R and S are excellent in discharge capacity in high-rate discharge compared with the battery T as a comparative example. The reason is that the active material utilization of the cadmium electrode in each of the batteries according to the invention is excellent as described above in Example 4, compared with the conventional battery.

Of these batteries according to the invention, the battery S is inferior in capacity in high-rate discharge. The reason is thought to be that the greater part of cadmium oxide is hydrated in a short time required for dissolving hydroxyethylcellulose in the electrolyte and bringing it into contact with cadmium oxide. In short, it appears that $\gamma$-Cd(OH)$_2$ can be produced in the surface of the electrode in contact with the separator, but can be hardly produced in the inside of the electrode. It is therefore preferable that hydroxyethylcellulose is distributed into the cadmium electrode or dissolved in the alkaline electrolyte.

On the other hand, the transition of discharge capacity in repetition of cycles in each of the batteries was measured as follows. One-cycle forming charge/discharge at an atmospheric temperature of 20° C. was applied to the batteries prepared separately. Then, the batteries were charged with a maximum current of 5 CA and a constant voltage of 1.9 V for 15 minutes. Then, the batteries were discharged to 0.5 V with constant current of 0.2 CA. The charge/discharge cycle was repeated.

Figure 9:
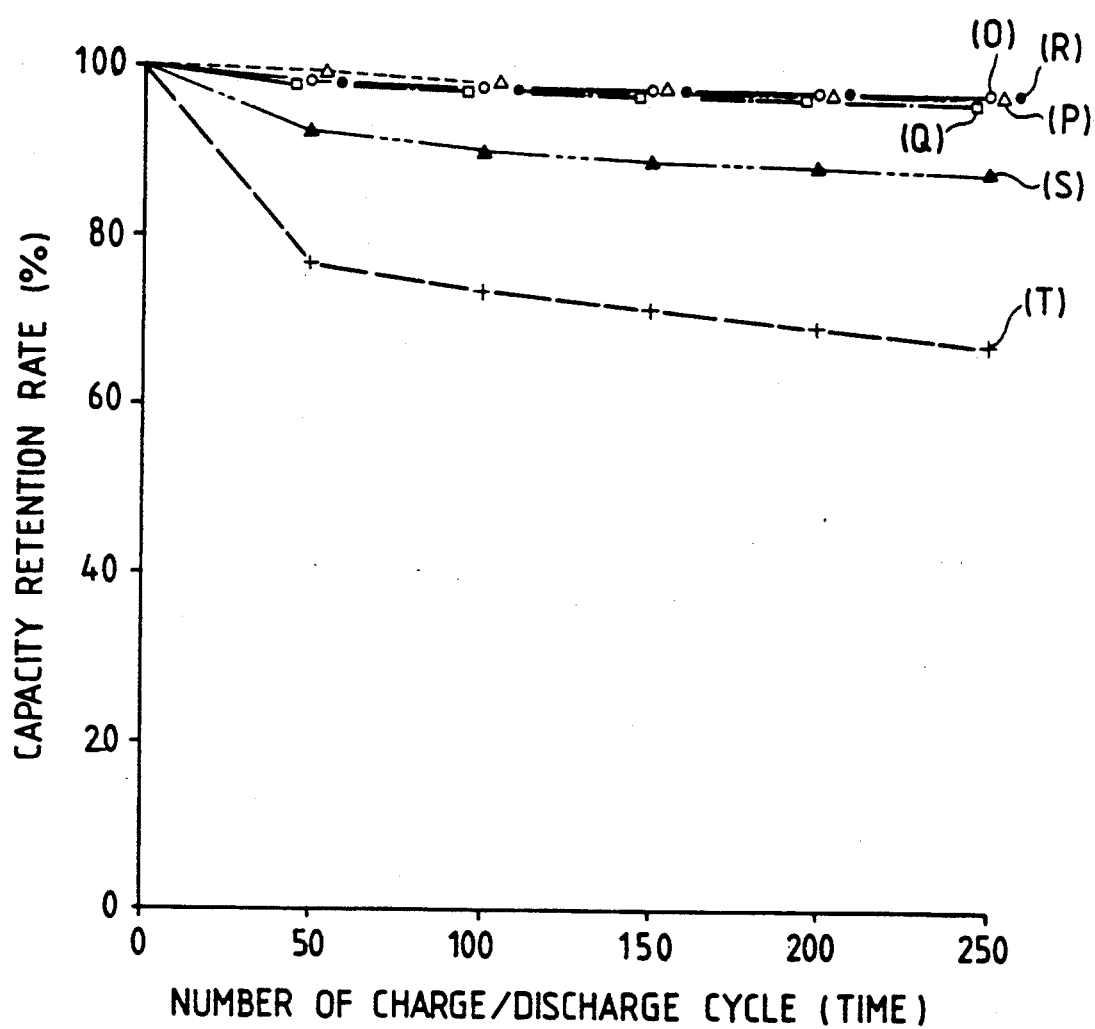
FIG. 9 is a view for comparison in capacity retention rate in charge/discharge cycles between nickel-cadmium batteries as an example according to the invention and as a comparative example.

Capacity retention rates in respective cycles are shown in FIG. 9, in which the discharge capacity in the second cycle is 100.

It is apparent from FIG. 9 that the batteries O, P, Q, R and S according to the invention are high in capacity retention rate compared with the battery T as a comparative example. The reason is that the active material in the negative electrodes of the batteries are very high in charging efficiency as described above in Example 4. Similarly to FIG. 8, the battery S is lowest in capacity retention rate compared with the other batteries of the invention. That is, the battery S does not sufficiently show the effect of the invention.

Then, for comparison the active material of the negative electrodes after charge/discharge cycles, the batteries P and T after 250 cycles were disjointed and the negative electrodes were washed and dried, whereafter electron micrographs of the surfaces of the negative electrodes were taken. The results are shown in FIG. 10. As shown in FIG. 10, the active material in the negative electrode of the battery P of the invention is a substantially needle-like crystal, whereas the active material in the negative electrode of the battery T as a comparative example is substantially hexagonal crystal.

This fact agrees with the result of FIG. 9 and shows that the performance of the battery of the invention containing a large quantity of $\gamma$-Cd(OH)$_2$ in the negative electrode is excellent. Further, it is apparent from the processes for producing the respective batteries that the batteries O, P, and R according to the invention require no special producing process compared with the battery T as a comparative example. Further, the battery Q can be produced by the same process as the battery using a conventional forming-type negative electrode.

In the following, the relation between the hydroxyethylcellulose content and the discharge performance of the battery are described.

Sample batteries were prepared in the same manner as the battery P, except that the hydroxyethylcellulose content in the battery P was changed within the range of from 0 g/l to 16 g/l. The following test was conducted on the batteries thus prepared.

Figure 11:
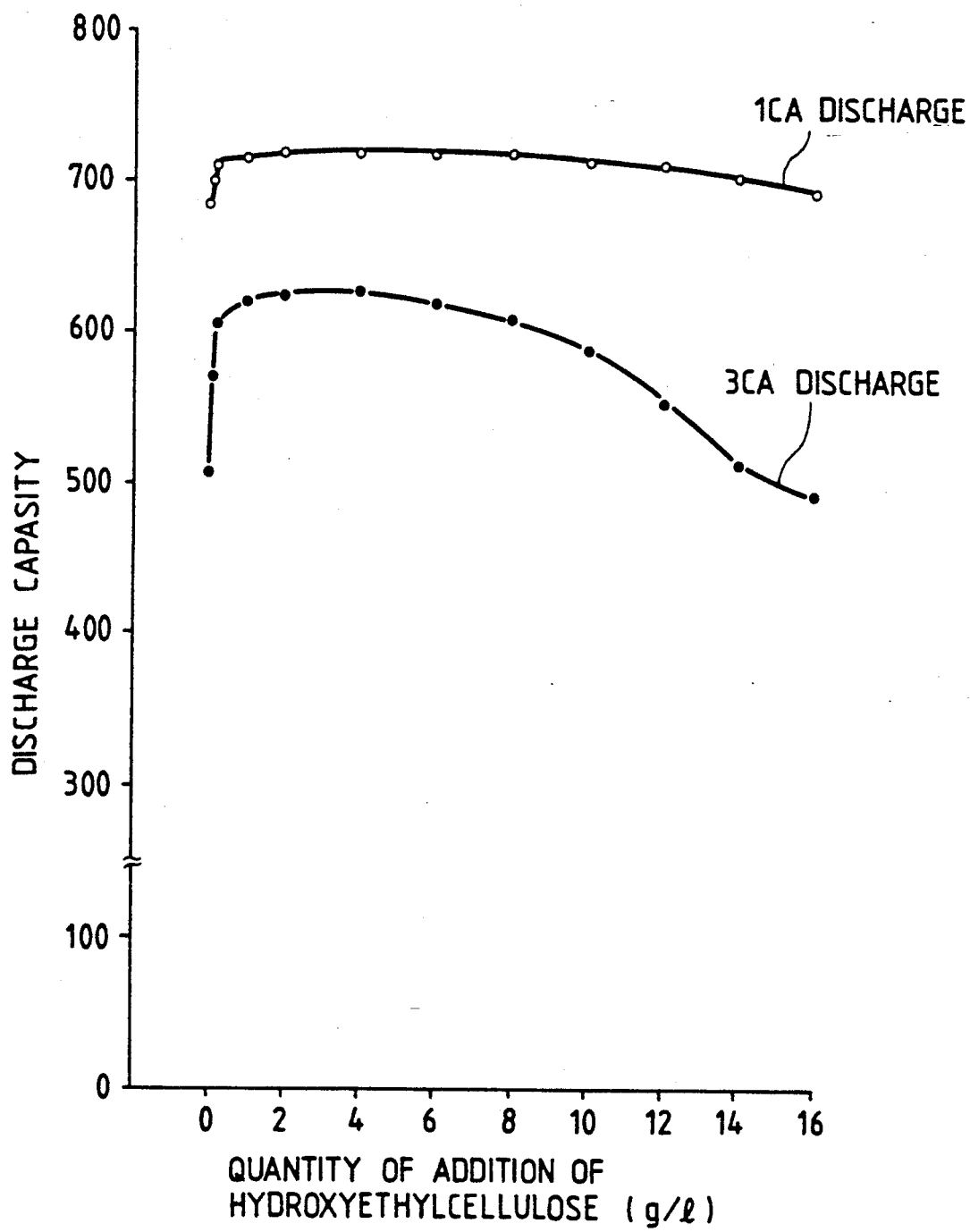
FIG. 11 is a view showing the optimum range of the quantity of addition of hydroxyethylcellulose in the battery according to the present invention.

One-cycle forming charge/discharge was applied to these batteries at an atmospheric temperature of 20° C. Then, the batteries were charged with a maximum current of 0.1 CA and a constant voltage of 1.6 V for 20 hours. Then, the batteries were discharged with constant currents of 1 CA and 3 CA. Discharge capacities of the respective rates are shown in FIG. 11. It is apparent from FIG. 11 that the discharge capacity in 1 CA discharge increases when the hydroxyethylcellulose content is not less than 0.1 g/l, and that the increase of the discharge capacity is particularly remarkable when the quantity of addition is not less than 0.2 g/l. On the other hand, the discharge capacity in 3 CA discharge increase when the hydroxyethylcellulose content is not less than 0.1 g/l, but the increase of the capacity is reduced gradually when the hydroxyethylcellulose content is not less than 4 g/l. The reason for this is not clear, but little increase of the capacity can be found when the content is not less than 10 g/l. The result of Example 3 has shown that a large quantity of $\gamma$-Cd(OH)$_2$ can be produced even though the hydroxyethylcellulose content is not more than 12 g/l. Accordingly, the result of FIG. 11 is considered to be caused by the fact that the viscosity of the electrolytic solution increases as the hydroxyethylcellulose content increases.

It is apparent from the aforementioned result that the effect of the invention can hardly be obtained when the hydroxyethylcellulose content is not more than 12 g/l. Accordingly, it can be said that the hydroxyethylcellulose content is preferably within a range of from 0.1 g/l to 10 g/l and more preferably within a range of from 0.2 g/l to 9 g/l.

Although the aforementioned example has shown the case where nickel hydroxide is used as the active material in the positive electrodes, the same effect as in the nickel-cadmium battery can be obtained by use of manganese dioxide or silver oxide instead of nickel hydroxide. Therefore, the following examples illustrate manganese dioxide-cadmium batteries using manganese dioxide as an active material in the positive electrodes.

EXAMPLE 6

Battery U: (Example of the Invention)

Into 30 ml of propylene glycol, 100 part by weight of cadmium oxide powder and 0.2 part by weight of polyvinylalcohol short fiber of 1 mm length were mixed. The resulting mixture was applied to an expanded metal of copper, dried and pressed to prepare a negative electrode. The negative electrode was charged in a 6M potassium hydroxide aqueous solution containing 1 g/l of hydroxyethylcellulose, to change all cadmium oxide to metallic cadmium. Then, the negative electrode was washed, dried and pressed to prepare a 2.9×14×52 (mm) negative electrode having the total theoretical capacity of 800 mAh.

On the other hand, positive electrodes were prepared as follows. In 30 ml of an aqueous dispersion containing 60% by weight of polytetrafluorethylene powder, 80 parts by weight of manganese dioxide ($\gamma$-MnO$_2$) and 10 parts by weight of graphite were mulled and then rolled in the form of sheets. Then, the sheets were further pressed onto a nickel net of 20 mesh from opposite sides, to thereby prepare two of 1.4×14×52 mm positive electrodes having the theoretical capacity of 200 mAh.

Then, a negative electrode was covered with polyvinyl alcohol nonwoven separator having a thickness of about 0.2 mm. Then, the negative electrode was put between the two positive electrodes with use of an electrolyte consisting of 2.7 ml of an 8.5M potassium hydroxide aqueous solution, to thereby prepare a manganese dioxide-cadmium battery U having the nominal capacity of 240 mAh and using a cell made of synthetic resin.

Battery V: (Comparative Example)

A battery V was prepared in the same manner as the battery U, except that hydroxyethylcellulose used for the production of the negative electrode of the battery U was removed.

Then, the cycle test in which the batteries U and V were discharged by 100 mAh with a current of 0.1 CA at 20° C. and then charged to 1.6 V with the same current was conducted.

Figure 12:
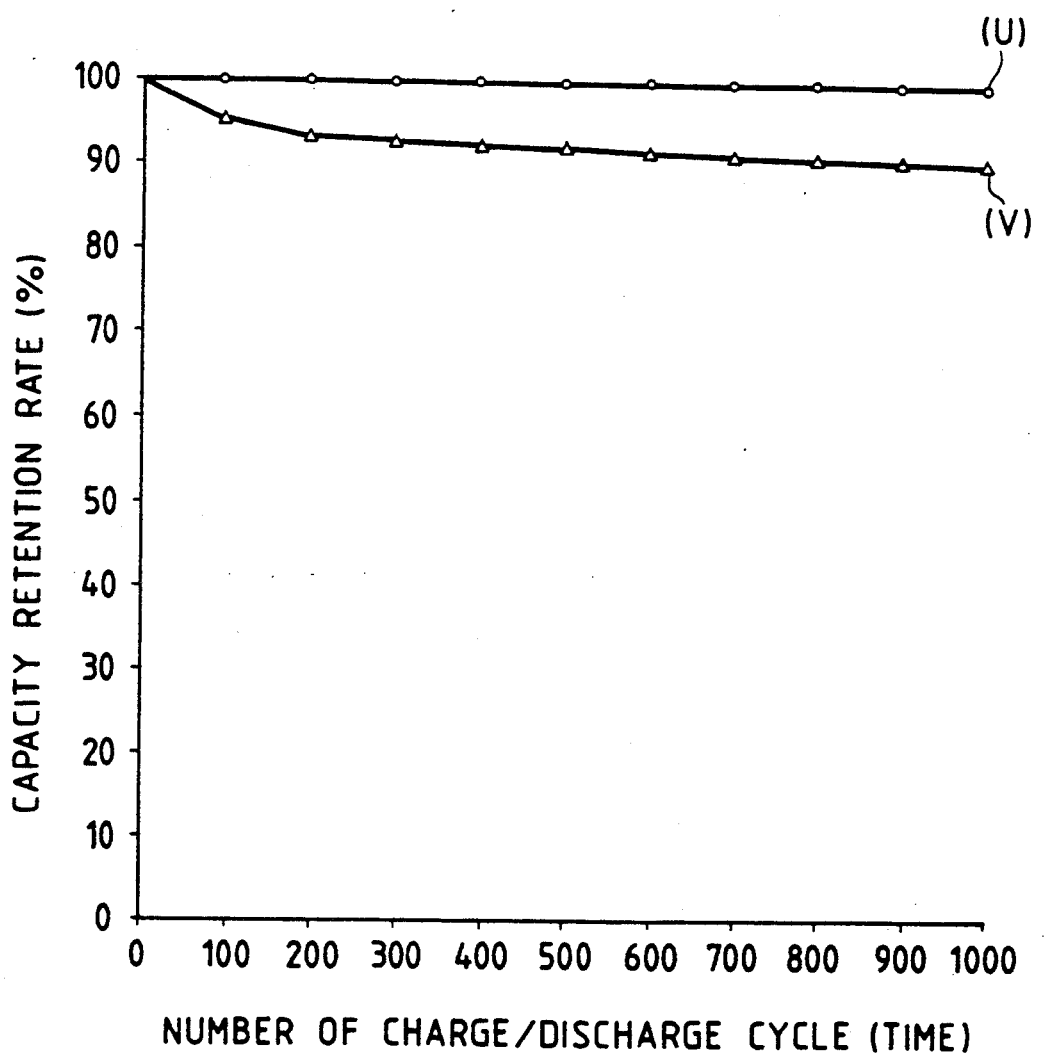
FIG. 12 is a view for comparison in capacity retention rate in charge/discharge cycles between manganese dioxide-cadmium batteries as an example according to the invention and as a comparative example.

Capacity retention rates in respective cycles based on the discharge capacity in the first cycle are shown in FIG. 12. It is apparent from FIG. 12 that the battery U of the invention is lower in capacity decrease than the battery V as a comparative example and that the discharge capacity of the battery U changes little during 1000 cycles. This fact is based on the high charging efficiency of the cadmium electrode as described above. These batteries have little reserved cadmium hydroxide. In each of the batteries, the weight of cadmium hydroxide in the negative electrode was about 0.84 times (2.73(g/Ah)/3.73(g/Ah)) as much as the weight of manganese dioxide in the positive electrodes.

The present invention has been described with reference to the cases where the invention is applied to nickel-cadmium batteries and manganese dioxide-cadmium batteries. Similarly, in silver oxide-cadmium batteries, it is easy to control charge, and good lifetime can be obtained by use of silver oxide as an active material in the positive electrodes. In short, similarly stable capacity change can be obtained in silver oxide-cadmium batteries constructed so that the weight of cadmium hydroxide in the negative electrode is 1.36 times as much as the weight of silver in the positive electrodes.

As described above, the invention provides a process for easily producing $\gamma$-Cd(OH)$_2$, which is useful as an active material in a cadmium negative electrode, to thereby make it possible to improve the charge/discharge performance and energy density of an alkaline secondary battery having such a cadmium negative electrode.

In particular, in a battery having a cadmium electrode containing little reserved cadmium hydroxide, in which charge is controlled by detecting the potential change to the hydrogen evolution of the negative electrode, the potential change in the last stage of the charging period becomes very large and sharp, due to $\gamma$-Cd(OH)$_2$ contained in the negative electrode. This fact means that superrapid charging over a wide temperature range can be conducted.

While the invention has been described in detail and with reference to specific examples thereof, it will be apparent to one skilled in the art that various changes and modifications can be made therein without departing from the spirit and scope thereof.

What is claimed is:

1. A process for preparing cadmium hydroxide in which cadmium oxide is to react with an alkaline aqueous solution containing hydroxyethylcellulose or water containing hydroxyethylcellulose.

2. A process for preparing cadmium hydroxide in which a mixture containing hydroxyethylcellulose and cadmium oxide is caused to react with an alkaline aqueous solution containing sodium hydroxide.

3. A process for preparing cadmium hydroxide according to claim 1, in which cadmium oxide is aquated in the presence of metallic cadmium.

4. A process for preparing cadmium hydroxide according to claim 2, in which cadmium oxide is aquated in the presence of metallic cadmium.

5. A nickel-cadmium alkaline secondary battery having a nickel hydroxide positive electrode and a cadmium negative electrode, in which the weight of cadmium hydroxide contained in said negative electrode is not more than 0.95 times as much as the weight of nickel hydroxide contained in said positive electrode, and in which $\gamma$-Cd(OH)$_2$ exists in said negative electrode.

6. A manganese dioxide-cadmium alkaline secondary battery having a positive electrode including manganese dioxide as a main active matter and a negative electrode including metallic cadmium as a main active material, in which the weight of cadmium hydroxide contained in said negative electrode is not more than 0.84 times as much as the weight of manganese dioxide contained in said positive electrode when said battery is discharged, and in which $\gamma$-Cd(OH)$_2$ exists in said negative electrode.

7. A manganese dioxide-cadmium alkaline secondary battery having a positive electrode including manganese dioxide as a main active material and nickel hydroxide, and a negative electrode including metallic cadmium as a main active material cadmium hydroxide, in which the weight of cadmium hydroxide contained in said negative electrode is not more than the sum of 0.84 times as much as the weight of manganese dioxide and 0.95 times as much as the weight of nickel hydroxide in said positive electrode when said battery is discharged, and in which $\gamma$-Cd(OH)$_2$ exists in said negative electrode.

8. A silver oxide-cadmium alkaline secondary battery having a silver oxide positive electrode and a cadmium negative electrode, in which the weight of cadmium hydroxide contained in said negative electrode is not more than 1.36 times as much as the weight of silver contained in said positive electrode, and in which $\gamma$-Cd(OH)$_2$ exists in said negative electrode.

9. A method for charging a nickel cadmium alkaline secondary battery having a nickel hydroxide positive electrode and a cadmium negative electrode, in which the weight of cadmium hydroxide contained in said negative electrode is not more than 0.95 times as much as the weight of nickel hydroxide contained in said positive electrode, and in which $\gamma$-Cd(OH)$_2$ exists in said negative electrode, in which an initial charging current is established so as to be not more than 1 CA on the basis of the theoretical capacity of cadmium hydroxide contained in the negative electrode.

10. A method for charging a manganese dioxide-cadmium alkaline secondary battery having a positive electrode including manganese dioxide as a main active material and a negative electrode including metallic cadmium as a main active matter, in which the weight of cadmium hydroxide contained in said negative electrode is not more than 0.84 times as much as the weight of manganese dioxide contained in said positive electrode when said battery is discharged, and in which $\gamma$-Cd(OH)$_2$ exists in said negative electrode, in which an initial charging current is established so as to be not more than 1 CA on the basis of the theoretical capacity of cadmium hydroxide contained in the negative electrode.

11. A method for charging a manganese dioxide-cadmium alkaline secondary battery having a positive electrode including manganese dioxide as a main active material and nickel hydroxide, and a negative electrode including metallic cadmium as a main active matter and cadmium hydroxide, in which the weight of cadmium hydroxide contained in said negative electrode is not more than the sum of 0.84 times as much as the weight of manganese dioxide and 0.95 times as much as the weight of nickel hydroxide in said positive electrode when said battery is discharged, and in which $\gamma$-Cd(OH)$_2$ exists in said negative electrode, in which an initial charging current is established so as to be not more than 1 CA on the basis of the theoretical capacity of cadmium hydroxide contained in the negative electrode.

12. A method for charging a silver oxide-cadmium alkaline secondary battery having a silver oxide positive electrode and a cadmium negative electrode, in which the weight of cadmium hydroxide contained in said negative electrode is not more than 1.36 times as much as the weight of silver contained in said positive electrode, and which $\gamma$-Cd(OH)$_2$ exists in said negative electrode, in which an initial charging current is established so as to be not more than 1 CA on the basis of the theoretical capacity of cadmium hydroxide contained in the negative electrode.

* * * * *

UNITED STATES PATENT AND TRADEMARK OFFICE
CERTIFICATE OF CORRECTION

PATENT NO. : 5,071,722
DATED : December 10, 1991
INVENTOR(S) : Koji Yoshimura

It is certified that error appears in the above-identified patent and that said Letters Patent is hereby corrected as shown below:

At column 21, line 43, in claim 1, after "is" insert -- caused --.

At column 23, line 3, in claim 12, after "and" insert -- in --.

Signed and Sealed this

Twenty-ninth Day of December, 1992

Attest:

DOUGLAS B. COMER

*Attesting Officer*    Acting Commissioner of Patents and Trademarks